United States Patent
Tingley

(10) Patent No.: US 8,348,089 B2
(45) Date of Patent: Jan. 8, 2013

(54) INDUSTRIAL BAKING TRAY WITH CONTOURED REINFORCEMENT BAND

(75) Inventor: Jason Tingley, Beavercreek, OH (US)

(73) Assignee: American Pan Company, Urbana, OH (US)

( * ) Notice: Subject to any disclaimer, the term of this patent is extended or adjusted under 35 U.S.C. 154(b) by 0 days.

(21) Appl. No.: 13/102,318

(22) Filed: May 6, 2011

(65) Prior Publication Data

US 2011/0272415 A1 Nov. 10, 2011

Related U.S. Application Data

(60) Provisional application No. 61/331,894, filed on May 6, 2010.

(51) Int. Cl.
*B65D 6/34* (2006.01)
*A47J 37/01* (2006.01)

(52) U.S. Cl. ......................................... 220/641; 220/642

(58) Field of Classification Search .................. 220/640, 220/641, 642, 643, 644, 645
See application file for complete search history.

(56) References Cited

U.S. PATENT DOCUMENTS

| | | | |
|---|---|---|---|
| 1,069,204 A | 8/1913 | Thien et al. | |
| 2,347,694 A | 5/1944 | Langel | |
| 3,089,450 A | 5/1963 | Lyon, Jr. | |
| 4,499,997 A | 2/1985 | Swingley, Jr. | |
| 4,795,049 A * | 1/1989 | Alcorn | 220/642 |
| 7,150,221 B2 * | 12/2006 | Morgan | 99/428 |
| 2002/0171027 A1 * | 11/2002 | Martellato et al. | 249/160 |

FOREIGN PATENT DOCUMENTS

GB 364435 A 1/1932

OTHER PUBLICATIONS

International Search Report and Written Opinion received in PCT/US2011/035482, mailed Aug. 3, 2011.

* cited by examiner

*Primary Examiner* — Steven A. Reynolds
*Assistant Examiner* — King M Chu
(74) *Attorney, Agent, or Firm* — McNees Wallace & Nurick, LLC

(57) ABSTRACT

An industrial or commercial baking tray that includes a baking surface; a walled portion surrounding the baking surface and formed integrally therewith; and a contoured reinforcing band positioned around the perimeter of the walled portion, wherein the top edge of the walled portion has been adapted to enclose at least a portion of the contoured reinforcing band; and wherein the cross-sectional geometry of the contoured reinforcing band is operative to impart strength and stability to the baking tray while reducing the overall mass of the reinforcing band.

6 Claims, 3 Drawing Sheets

INDUSTRIAL BAKING TRAY WITH CONTOURED REINFORCEMENT BAND

CROSS-REFERENCE TO RELATED APPLICATIONS

This patent application claims the benefit of U.S. Provisional Patent Application Ser. No. 61/331,894 filed on May 6, 2010 and entitled "Industrial Baking Pan with Channel Band," the disclosure of which is hereby incorporated by reference herein in its entirety and made part of the present U.S. utility patent application for all purposes.

BACKGROUND OF THE INVENTION

The present invention relates generally to baking pans and trays for industrial and commercial use, and more specifically to a baking tray that includes a reinforcing perimeter band having a novel geometry for imparting structural strength and stability to the tray.

Baking pans or trays are commonly used by producers of various baked goods that are supplied to restaurants and grocery stores. Because producers of baked goods often supply large quantities of baked goods to their customers, the trays such goods are baked on are reused many times and are repeatedly subjected to both high thermal and mechanical stresses. Baking pans are often stacked on top of one another, and it is common for a stack of baking pans to include more than fifty pans. Stacking pans in this manner creates significant pressure on the bottom pan in a stack, and the weight on the bottom pan may be 500 pounds or more. Thus, repeated use and repeated exposure to high temperatures and mechanical stress requires that an industrial baking tray be manufactured from a durable material such as steel or aluminum. Although manufacturing a baking tray from materials such as steel or aluminum does increase the lifespan of the tray repeated use, re-glazing, or other physical or chemical stressors eventually weakens the metal of the tray and cracks or fractures may appear in the metal surface of the tray. Once a tray has sustained such damage, it is no longer useable and must be discarded. Due to the expense of replacing industrial baking trays, additional features may be included to lend strength and stability, particularly when the tray is large in size.

One approach to adding strength and durability to large baking trays or pans has been the inclusion of a rigid metal band that is positioned around the entire upper edge of a baking tray or pan and held in place by rolling the top edge of the tray or pan outward and downward to partially or completely enclose the metal band. While effective for increasing the overall strength of the tray or pan, this metal band, which is typically solid steel, can add significant and undesirable weight to each tray or pan. Additionally, the use of such metal reinforcing bands may necessitate greater energy input with regard to reaching the temperatures required for effective and complete baking. To reduce weight and the energy input required when using industrial baking trays and pans, there is an ongoing need for a lightweight, yet effective structural reinforcement that is compatible with such items.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a baking tray is provided. This baking tray includes a baking surface; a walled portion surrounding the baking surface and formed integrally therewith; and a contoured reinforcing band positioned around the perimeter of the walled portion. The top edge of the walled portion has been adapted to enclose at least a portion of the contoured reinforcing band. The cross-sectional geometry of the contoured reinforcing band is operative to impart strength and stability to the baking tray while reducing the overall mass of the reinforcing band. The contoured reinforcing band further includes at least one lengthwise channel formed therein.

In accordance with another aspect of the present invention, an industrial baking tray is provided. This baking tray includes a baking surface; a walled portion surrounding the baking surface and formed integrally therewith; and a contoured reinforcing band positioned around the perimeter of the walled portion. The top edge of the walled portion has been adapted to enclose at least a portion of the contoured reinforcing band, which further includes a plurality of lengthwise channels formed therein.

In yet another aspect of this invention, an industrial baking tray is also provided. This baking tray includes a baking surface; a walled portion surrounding the baking surface and formed integrally therewith; a contoured reinforcing band positioned around the perimeter of the walled portion; and a plurality of baking subunits formed in the baking surface. The top edge of the walled portion has been adapted to enclose at least a portion of the contoured reinforcing band, which further includes three lengthwise channels formed therein.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. With reference now to the Figures, one or more specific embodiments of this invention shall be described in greater detail.

Figure 1:
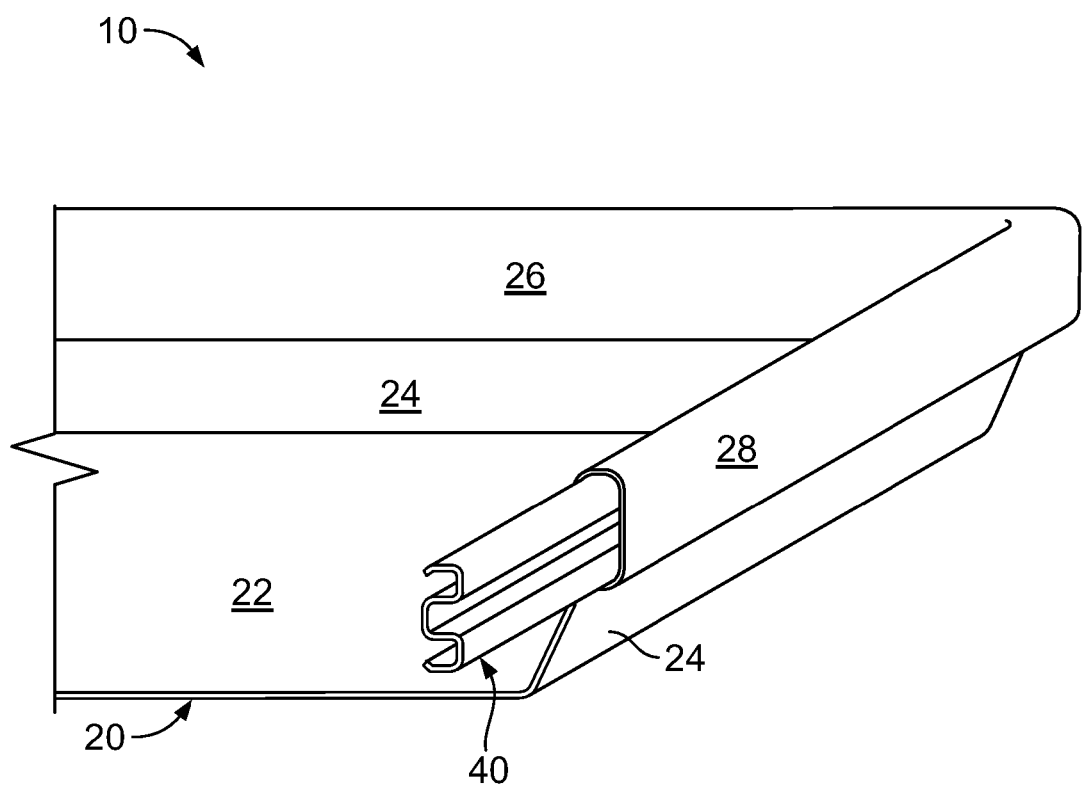
FIG. 1 is a partial perspective view of an industrial baking tray in accordance with an exemplary embodiment of the present invention, wherein a portion of the contoured reinforcing band is shown protruding from the top edge of the baking tray.
Figure 2:
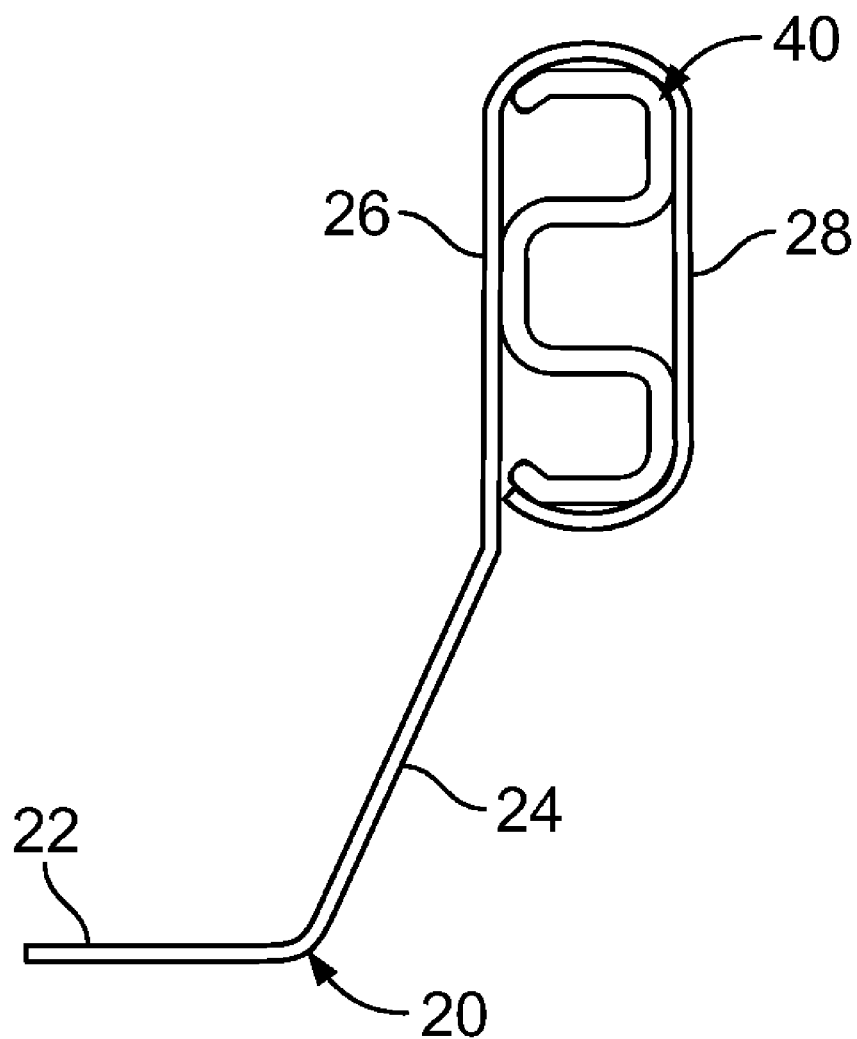
FIG. 2 is a cross-sectional side view of the baking tray of FIG. 1 showing the top edge of the walled portion enclosing the contoured reinforcing band.
Figure 3A:
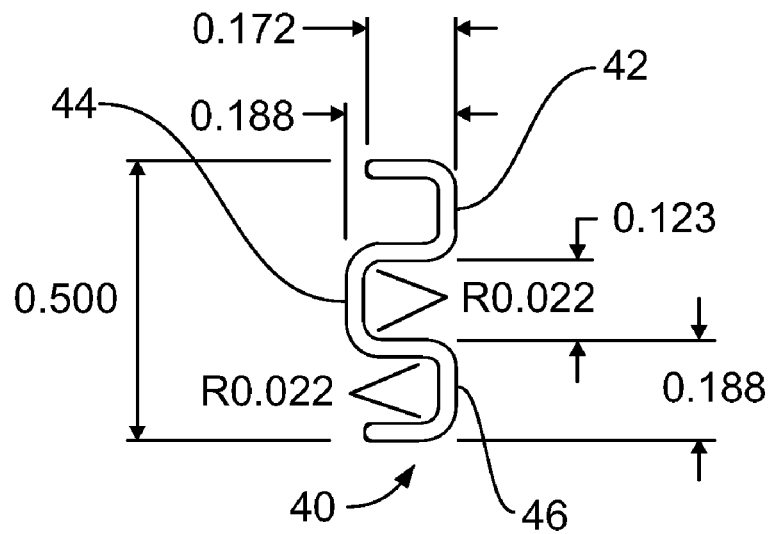
FIGS. 3A-B are cross-sectional side views of alternate embodiments of the contoured reinforcing band.
Figure 3B:
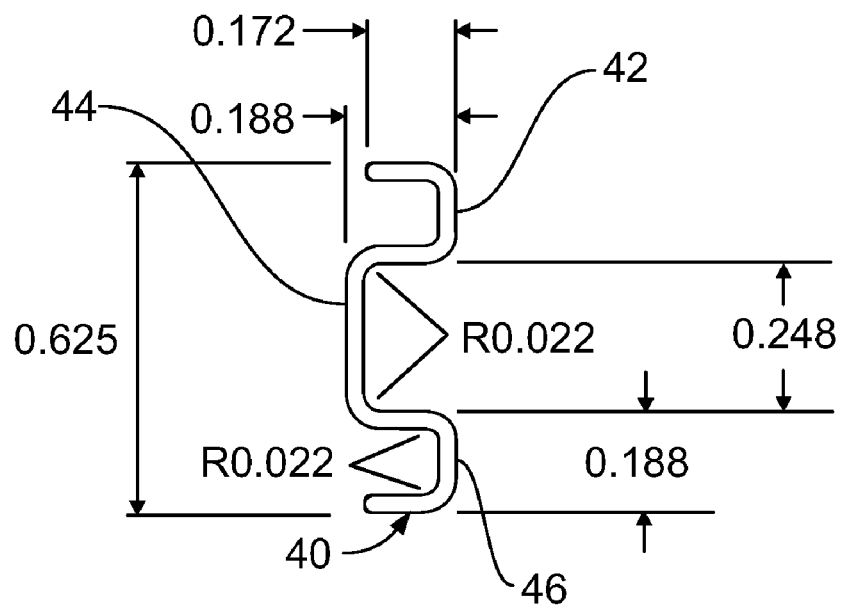

As shown in FIGS. 1-2 and 3A-B, an exemplary embodiment of baking tray assembly 10 includes baking tray 20 and contoured reinforcing band 40. Baking tray 20 further includes a horizontal bottom surface 22, an outwardly angled sidewall surface 24 surrounding bottom surface 22, and a vertical side wall surface 26 formed above angled sidewall surface 24. Contoured reinforcing band 40 is positioned around the outer perimeter of vertical sidewall surface 26, the top portion of which is rolled downward to create lip 28 for enclosing and securing contoured reinforcing band 40. In the exemplary embodiment shown in the Figures, contoured reinforcing band 40 includes first portion 42, second portion 44, and third portion 46. First portion 42 defines a first inward-facing lengthwise channel, second portion 44 defines an outward-facing lengthwise channel, and third portion 46 defines a second inward-facing channel. Due to its high strength to weight ratio, the unique multiple s-shaped cross-sectional geometry of contoured reinforcing band 40 provides baking tray 20 with adequate structural strength and stability while using only a portion of the material found in solid bands of a similar nature. Both tray 20 and contoured reinforcing band 40 may be fabricated from carbonized steel, aluminum, stainless steel, or any other suitable metal. The dimensions of the perimeter band may vary depending on the overall dimensions and physical characteristics of a particular type of tray (see FIG. 3B, wherein the width of the outward-facing lengthwise channel has been increased).

Baking assembly 10 provides numerous benefits including: (i) lowered heat retention in contoured reinforcing band 40, which permits the baking tray or pan to cool more rapidly, thereby allowing for a faster cycling of the baking process; and (ii) increased energy efficiency with regard to the amount of energy required to heat the tray or pan in an oven during baking, i.e. the decreased mass of contoured reinforcing band 40 reduces the total amount of energy required to heat baking tray assembly 10. Both of these issues are significant concerns in commercial baking processes and this invention provides a novel solution to problems arising from these concerns.

Certain embodiments of this invention include products referred to as the "e-pan" due to energy savings associated with use of the pan. The e-pan is usually made from steel that is more than twice the strength of that used in prior baking pans. Despite the increased strength, the thinness of this material results in a pan that is about 30% lighter than the current industry standard. Inclusion of contoured reinforcing band 40, as opposed to a solid steel band, typically reduces the weight of the tray by another 15%. Other versions of this invention include commercial products that are marketed as the "e2", which may include additional energy saving or efficiency increasing features.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A baking tray, comprising:
   (a) a baking surface;
   (b) a walled portion surrounding the baking surface and formed integrally therewith, wherein the top edge of the walled portion extends outward, then downward, and then inward relative to the baking surface to form an enclosure;
   (c) a contoured reinforcing band disposed within the enclosure, wherein the contoured reinforcing band consists of a first flattened region that extends outward from the walled portion, a second flattened region that extends downward from the first flattened region at a right angle thereto, a third flattened region that extends inward from the from the second flattened region at a right angle thereto, a fourth flattened region that extends downward from the third flattened region at a right angle thereto, a fifth flattened region that extends outward from the fourth flattened region at right angle thereto, a sixth flattened region that extends downward from the fifth flattened region at a right angle thereto, and a seventh flattened region that extends inward from the sixth fattened region at a right angle thereto; and
   (d) wherein the geometry of the contoured reinforcing band is operative to impart strength and stability to the baking tray while reducing the overall mass of the reinforcing band.

2. The baking tray of claim 1, wherein the contoured reinforcing band further includes an outward-facing lengthwise channel positioned between two inward-facing lengthwise channels.

3. The baking tray of claim 2, wherein the width of the outward-facing channel is greater than the width of each of the two inward-facing channels.

4. The baking tray of claim 1, wherein the material of the baking surface and walled portion surrounding the baking surface is the same as the material of the contoured reinforcing band.

5. The baking tray of claim 1, wherein the material of the baking surface and walled portion surrounding the baking surface is different than the material of the contoured reinforcing band.

6. The baking tray of claim 1, wherein the baking tray is fabricated from tin-plated steel, aluminized steel, carbonized steel, stainless steel, titanium or aluminum; and
   wherein the contoured reinforcing band tray is fabricated from tin-plated steel, aluminized steel, carbonized steel, stainless steel, titanium or aluminum.

* * * * *